Figure 1:
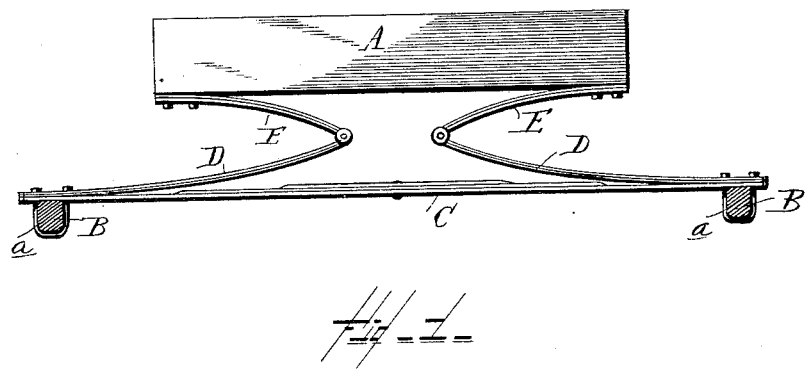

(No Model.)

C. C. HAYES.
VEHICLE SPRING.

No. 419,196. Patented Jan. 14, 1890.

Witnesses
Albert Speiden
E. H. Bond

Inventor
Charles C. Hayes
By his Attorney
Chas. H. Fowler

UNITED STATES PATENT OFFICE.

CHARLES C. HAYES, OF PENN YAN, NEW YORK.

VEHICLE-SPRING.

SPECIFICATION forming part of Letters Patent No. 419,196, dated January 14, 1890.

Application filed May 31, 1889. Serial No. 312,723. (No model.)

*To all whom it may concern:*

Be it known that I, CHARLES C. HAYES, a citizen of the United States, residing at Penn Yan, in the county of Yates and State of New York, have invented certain new and useful Improvements in Running-Gear; and I do hereby declare that the following is a full, clear, and exact description of the same, reference being had to the annexed drawings, making a part of this specification, and to the letters of reference marked thereon.

This invention relates to certain new and useful improvements in vehicles, and has relation more particularly to the running-gear or springs thereof.

It has for its object to so mount the body and to so arrange the springs that each shall assist the other in sustaining the strain and jolts occasioned in running over uneven ground and to provide a very easy-running vehicle, which shall be simple and durable.

The invention consists in the peculiar combinations and the construction, arrangement, and adaptation of parts, all as more fully hereinafter described, shown in the drawings, and then particularly pointed out in the appended claim.

The invention is clearly illustrated in the accompanying drawings, which, with the letters of reference marked thereon, form a part of this specification, and in which—

Figure 2:
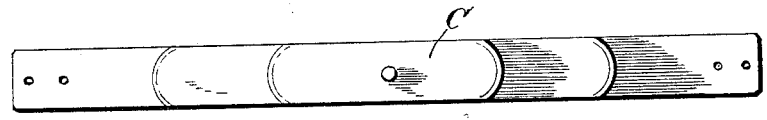

Figure 1 is an end elevation, with parts shown in section, of a portion of a vehicle provided with my improvements. Fig. 2 is a top plan view of the main spring thereof.

Referring now to the details of the drawings by letter, A designates the body of the vehicle, and B B the side bars.

C is a practically-flat leaf-spring secured at its ends to the side bars, or, when the springs are arranged parallel with the axles, instead of at right angles thereto, as shown in the drawings, the said spring will be secured to the axle.

D are semi-elliptic leaf-springs secured at their outer ends to the outer ends of the spring C in any well-known manner, preferably, however, in the manner shown in Fig. 1, in which *a* are clips which serve not only to secure the ends of the spring C to the side bars, but serve also to secure the outer ends of the semi-elliptic springs D to the outer ends of the said spring C, as shown.

E are portions of semi-elliptic springs arranged reversely of the springs D and secured at their outer ends to the bottom of the body of the vehicle and at their inner ends hinged to the inner ends of the springs D, as shown.

By the construction above described I provide a very easy-riding spring, and the arrangement has been found to produce a spring that is very durable, not likely to get out of order, as each spring assists the other in receiving the shock and sustaining the strain; furthermore, the bearing on the springs all comes on the outer ends thereof, and if they should break they can be repaired at very little expense and trouble.

What I claim as new is—

The combination, with the body and side bars, of the main spring C, the springs D, with their outer ends resting on the outer ends of the main spring, the clips *a*, securing the outer ends of the springs C and D together and to the side bars, and the springs E, hinged at their inner ends to the inner ends of the springs D and at their outer ends secured to the under side of said body, substantially as shown and described.

In testimony that I claim the above I have hereunto subscribed my name in the presence of two witnesses.

CHARLES C. HAYES.

Witnesses:
 BYRON EATON,
 ALFRED CROSBY.